Oct. 28, 1947.  J. W. TETER  2,429,854
CATALYTIC CRACKING OF HYDROCARBON OILS TO PRODUCE GASOLINE
Filed Jan. 15, 1941
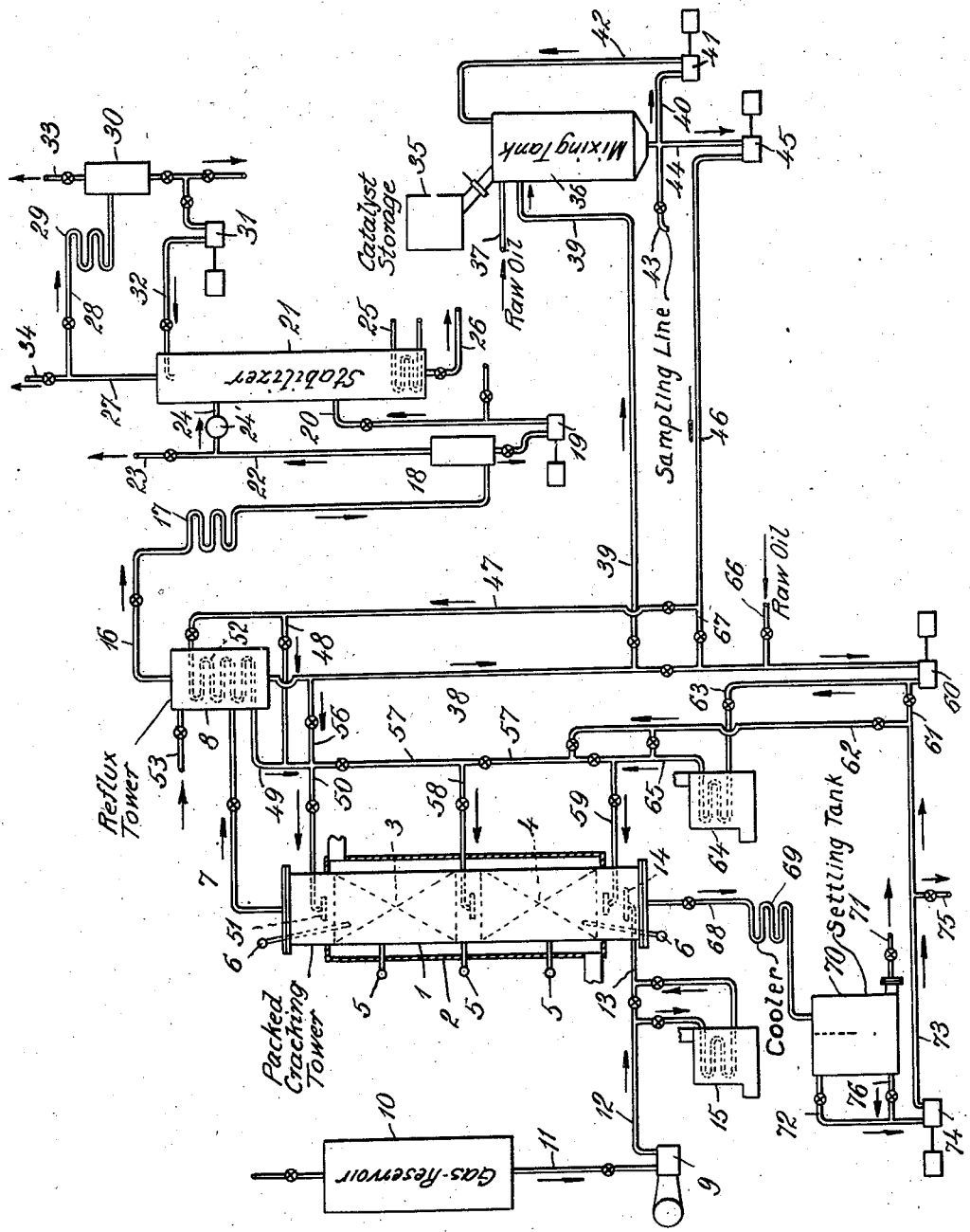
INVENTOR
John W. Teter
BY
Pennie Davis Marvin & Edmonds
ATTORNEYS Patented Oct. 28, 1947

2,429,854

UNITED STATES PATENT OFFICE 2,429,854

CATALYTIC CRACKING OF HYDROCARBON OILS TO PRODUCE GASOLINE

John W. Teter, Chicago, Ill., assignor to Sinclair Refining Company, New York, N. Y., a corporation of Maine Application January 15, 1941, Serial No. 374,479

4 Claims. (Cl. 196—52)

This invention relates to improvements in the catalytic cracking of hydrocarbon oils. More particularly the invention is concerned with cracking processes of the type wherein oil is cracked predominantly in the liquid phase at low or moderate cracking temperatures in the presence of a dispersed finely divided argillaceous catalyst.

Many types of catalytic cracking processes employing argillaceous catalyst have been heretofore proposed and that type wherein the oil is initially vaporized and the generated vapors are then passed in contact with a fixed bed of the catalytic material has been used with some success. In such processes it has been found that limitation of the temperature employed has the effect of increasing the extent of cracking produced catalytically relative to that effected thermally, with the result that the extent of gas formation is reduced while the gasoline obtained possesses those desirable properties that are characteristic of catalytic cracking to a greater extent. This trend has suggested the desirability of conducting processes of this general type under the less severe cracking conditions characteristic of liquid phase cracking operations. However, attempts to carry out catalytic processes with this type of catalyst at low or moderate cracking temperatures under conditions of temperature and pressure such that cracking is effected either entirely or predominantly in the liquid phase have not proved entirely satisfactory for a number of reasons.

Liquid phase operations with a fixed catalyst bed are impractical due to the limited periods of catalyst activity between reactivations and the impracticability of satisfactorily purging the catalyst bed of liquid hydrocarbons to permit reactivation at the required frequent intervals. Moreover the lower reaction rates, incident to the lower temperatures involved in liquid phase cracking, necessitate prolongation of the period of catalyst contact and the provision of extensive effective catalyst contact surfaces if reasonable gasoline yields and production rates are to be obtained. These requirements have placed serious limitations on catalytic cracking processes of the type wherein the catalyst in a finely divided state is admixed with the oil to be cracked and more or less uniformly dispersed through the oil during the cracking treatment because of the difficulty of maintaining the requisite degree of dispersion when the ratio of catalyst to oil is increased above a relatively low value. If the dispersed catalyst is permitted to settle momentarily, the effective contact surface is immediately reduced to an insignificant value. Furthermore redispersion of a thick layer of settled catalyst through the oil is difficult due to the tendency of the partially spent catalyst to cohere. Moreover, this settled material tends to bake into a solid mass if redispersion is not effected promptly.

I have devised a method of operation and arrangement of apparatus adapted for cracking oils predominantly in the liquid phase with dispersed argillaceous catalysts which possess a number of important advantages over proposals heretofore advanced. My process makes it possible to operate satisfactorily with a very high ratio of dispersed catalyst to oil within the cracking zone and with relatively long catalyst contact periods, thus permitting a satisfactory gasoline yield and rate of gasoline production together with improved gasoline yields per unit weight of catalyst while simultaneously obtaining the higher octane product and lower gas production that are characteristic of low temperature liquid phase catalytic cracking. Moreover, the use of my invention avoids the temporary formation of thick layers of partially spent catalyst notwithstanding those irregularities in operating conditions which are inevitable in cracking processes of this nature.

According to my process a substantial liquid body of the oil to be cracked is heated at a moderate cracking temperature in a vertically elongated cracking zone containing superposed baffling means adapted to distribute and disperse upwardly flowing gaseous products and to impede the downward flow of suspended solids. To this liquid body I supply the finely divided argillaceous catalyst dispersed in oil, while injecting gaseous products into the lower part of the cracking zone. Vapors are taken off from the upper end of this vertically elongated cracking zone and residual oil admixed with spent catalyst is withdrawn from the lower end thereof. Moreover, I control the rate at which gaseous products are supplied to the lower portion of the cracking zone relative to the rates at which oil and admixed catalyst are supplied to the cracking zone so as to maintain a high ratio of dispersed catalyst to oil within the cracking zone. Since the average rate at which the catalytic particles descend through the cracking zone may be controlled to a large extent by controlling the supply of gaseous products to the cracking zone, the ratio of suspended catalyst to oil within the cracking zone may be made to greatly exceed the ratio of catalyst to oil in the mixture supplied to the cracking zone.

The vertically elongated baffled cracking zone may comprise a heated tower packed with Raschig rings, berl saddles, or the like. If desired the zone may comprise a heated tower fitted with a series of conventional bubble trays. The baffling means in a tower of any of these types, function to disperse gaseous products flowing upwardly therethrough and they will also function to retard the downward flow of suspended particles of catalytic material in addition to improving the oil-catalyst-gas contact. Moreover in a tower provided with adequate baffling means through which there is an upwardly flowing stream of gaseous products, momentary fluctuations in the supply of gaseous products do not permit settling of suspended solids in thick layers which are difficult to redisperse even though the ratio of suspended catalyst to oil is high.

In the simplest form of the process of my invention fresh or reactivated catalyst is introduced into the cracking zone by initially admixing it with the fresh charging oil in the desired predetermined proportions and supplying the resulting dispersion directly to the upper portion of the cracking zone. Vapors taken off from the cracking zone may be subjected to refluxing treatment by any of the conventional methods and the insufficiently cracked condensate thus obtained may be returned to the cracking zone for further cracking treatment either directly or following admixture with an additional amount of active catalyst.

Under certain circumstances it is desirable to supply the fresh charging oil to a lower portion of the cracking zone and to supply the catalyst, dispersed in the reflux condensate, to the upper portion of the cracking zone. This method of operation affords certain advantages when dealing with a fresh charging stock that contains compounds of sulphur, oxygen, nitrogen and similar materials which tend to poison the catalyst, since by this procedure the fresh charge first contacts with partially spent catalyst. To a considerable extent the partially spent catalyst thus shields the active catalyst in the upper portion of the cracking zone from poisoning by the non-hydrocarbon constituents of the raw charge. This method of operation also is effective when the charging stock, or a portion thereof, contains heavy tarry constituents.

In carrying out the process of my invention substantially all of the heating may be directly applied to the oil in the cracking zone, as by external or internal indirect heat exchange. However, the heating load directly applied to the cracking zone may be reduced by preliminary heating of the gaseous products supplied to the lower end of the cracking zone and also by preheating the fresh charge or reflux condensate or both prior to their introduction into the cracking zone. When either the fresh feed or the reflux or both are subjected to preliminary heating prior to their introduction into the vertically elongated cracking zone, the catalyst may be dispersed therein in advance of the preheating. However, initial heating of the raw charging stock to the desired cracking temperature before permitting contact with the first catalyst has the advantage of minimizing loss of catalyst activity.

Residual oil including dispersed catalyst withdrawn from the lower end of the cracking zone may be conveyed to a settling zone wherein spent catalyst is permitted to settle, and from which the spent catalyst may be recovered for regeneration. With some oils under certain circumstances a portion of the withdrawn residual oil freed, or partially freed, from spent catalyst may be recirculated to the cracking zone, preferably to a point at least a substantial distance below the upper end thereof, for further cracking treatment.

The argillaceous catalysts particularly useful in the process of my invention include synthetic catalysts of high catalytic activity comprising silica and alumina or silica and alumina together with other metal oxides such as oxides of zirconium, chromium, and the like, which are commonly used in catalytic processes of the fixed bed type. However, I may use naturally occurring argillaceous catalysts, such as fuller's earth, as well as clays that have been acid treated to improve their activity. I use these materials in a finely divided state the fineness of which may vary from about 100 mesh or somewhat coarser to an almost impalpable powder. Under appropriate operating conditions particle sizes considerably exceeding 100 mesh may be used. However, the use of larger particles increases the amount of gaseous products required to maintain the catalyst in suspension.

The temperatures and pressures useful in my process vary with the nature of the charging stock, with the character of the catalyst and with the quantity and character of the products that it is desired to obtain. Temperatures varying from 600° to 900° F. have been employed satisfactorily with pressures ranging as high as 100 pounds per square inch. However, temperatures of 750°–850° F. are preferable as are pressures not exceeding 50 pounds per square inch. Higher pressures effect a marked decrease in the octane value of the gasoline product unless an excessive amount of catalyst is employed.

The gaseous product supplied to produce agitation and maintain the catalyst in suspension may comprise either an inert gas, a more or less reactive gas, or a mixture of the two. Gases suitable for this purpose include gaseous hydrocarbons produced in the operation of the process, hydrocarbon gases from extraneous sources, hydrogen, and inert gases such as steam, nitrogen, the oxides of carbon, and the like. If desired one or more of these gases may be supplemented with hydrocarbon vapors as for example hydrocarbon vapors produced by severe preliminary heating of a part of the reflux condensate or other volatile hydrocarbon distillate.

One form of apparatus adapted to carry out numerous modifications of the process of my invention is illustrated in the accompanying drawing in a conventional and diagrammatic form, and my invention will be further described in connection therewith. In the drawing, the vertically elongated cracking tower 1 is shown mounted in a furnace setting 2. Interiorly, tower 1 is provided with an upper section of packing material 3 and a similar lower section of packing material 4. Thermo-couples 5 are provided to indicate the skin temperature of the tower while thermo-couples 6 are arranged to indicate the oil temperature at the upper and lower ends of the packed portion of the tower. Vapor line 7 leads from the upper end of cracking tower 1 to a reflux tower 8. A compressor 9 is arranged to withdraw gas from reservoir 10 through line 11 and to force this gas through lines 12 and 13 into the lower end of tower 1 where it emerges through a distributor 14. Gas from line 12 may pass to tower 1 through line 13 directly or it may be by-passed through heater 15. A vapor line 16 leads from the top of reflux tower 8 through a condenser 17 to receiver 18.

Pump 19 is arranged to withdraw accumulated condensate from the lower end of receiver 18 and to supply this condensate through line 20 to a stabilizer 21. Gases accumulating in receiver 18 may be withdrawn therefrom through line 22 and either vented through line 23 or introduced to the upper portion of stabilizer 21 through line 24 by means of compressor 24'. A heater, for example steam coil 25, is disposed in the lower end of stabilizer 21 and the stabilized product may be drawn off from the lower end of stabilizer 21 through line 26. From the upper end of stabilizer 21 normally gaseous hydrocarbons are discharged through line 27 and may pass by line 28 and condenser 29 to receiver 30. A part of the light condensate from receiver 30 may be recirculated by pump 31 and line 32 to the upper portion of the stabilizer to assist in controlling the stabilizing operation. Gases may be vented from receiver 30 through line 33, or from stabilizer 21 through line 34, or from receiver 18 through line 23. Gases vented from any of these points may, if desired, be conveyed to gas receiver 10 to supply or assist in supplying the gaseous products used in the process.

A catalyst storage receptacle 35 is provided with means for supplying a predetermined quantity of finely divided catalyst to mixing tank 36 wherein the catalyst may be admixed with raw oil supplied from any suitable source through line 37, or with reflux condensate supplied from reflux tower 8 through lines 38 and 39 or with both. Any suitable mechanical mixing mechanism may be employed to obtain intimate admixture. This mixing may be effected or assisted by circulating a portion of the mixture from the lower part of tank 36 back to the upper part of the tank through line 40, pump 41 and line 42. The ratio of dispersed catalyst to oil in the mixture supplied to line 46 may be checked by means of the sampling line 43. A pump 45 is arranged to withdraw the mixture of oil and dispersed catalyst from tank 36 through line 44 and to supply this mixture through lines 46, 47, 48, 49 and 50 to the distributor 51 adjacent the upper end of cracking tower 1. If desired, all or a portion of the mixture from line 47 may be by-passed through coil 52 in reflux tower 8 to assist in controlling the refluxing operation while at the same time preheating the mixture. Supplemental control of tower 8 may be accomplished by the introduction of a suitable cooling oil through line 53 or by other conventional control means.

Line 38 through which reflux condensate is withdrawn from tower 8 is connected by valved line 56 with manifold 57 to permit direct return of reflux condensate to the packed cracking tower 1 through one or more of valved branches 50, 58 and 59 each of which may have a suitable distributing device at its discharge end. Line 38 is also connected with pump 60 which is arranged to discharge into header 57 either directly through lines 61 and 62, or alternatively through line 63, heater 64 and connection 65. An alternative raw oil connection 66 is provided to permit the introduction of raw oil, either directly or with preliminary heating in heater 64, into a lower or intermediate portion of tower 1 without permitting contact between the raw oil so supplied and the fresh catalyst. A valved by-pass line 67 connects line 46 with pump 60 to permit passage of the mixture of oil and catalyst from tank 36 through heater 64 before entering tower 1 when desired.

Residual oil and spent catalyst may be drawn off from the lower end of tower 1 through line 68 which leads through cooler 69 to settling tank 70. From tank 70 a concentrated slurry of spent or partially spent catalyst and residual oil may be drawn off through line 71 and the spent catalyst contained therein subjected to reactivation for further use. Residual oil substantially freed from suspended catalyst may be drawn off from the upper part of settling tank 70 through line 72. This residual oil passes to pump 74 from which it may be recirculated through lines 73 and 62 to a lower portion of cracking tower 1 or it may be discharged from the system through line 75. Valved connection 76 permits incorporation of a controlled amount of the settled catalyst in the residual oil mixture supplied to pump 74 if desired.

The following alternative methods of operating the illustrated apparatus will serve to illustrate several modifications of my invention each of which under certain conditions and with specific charging stocks possesses special advantages. One simple form of such operation in accordance with my invention involves supplying raw oil through line 37 to mixing tank 36 and there admixing it with the predetermined amount of finely divided catalyst supplied from the storage receptacle 35. This mixture is drawn off through line 44 by pump 45 and introduced to the upper end of the packed and externally heated tower 1 through lines 46, 47, 48, 49 and 50. Heating of the tower 1 is controlled to maintain the desired oil temperature therein, for example 810° F., while gas from reservoir 10 is supplied by compressor 9 through lines 12 and 13 to the lower end of tower 1. Reflux tower 8 is controlled to condense hydrocarbons higher boiling than the end point of the desired gasoline product and the reflux condensate is drawn off through line 38 and either by-passed through lines 56 and 50 to the upper end of the tower, or forced by pump 60 through preheater 64 and thence back to the tower through either branch line 58 or 59, the latter being preferred if preheating is carried to a temperature sufficiently high to effect substantial vaporization of the reflux condensate. The valve in vapor line 16 is regulated to maintain the desired pressure on tower 1. Residual oil and spent catalyst are drawn off from tower 1 through line 68 and cooler 69 and not reintroduced to the cracking zone.

An alternative method of operation is similar to that described except that a part of the residual oil from tank 70 is recirculated through lines 73 and 62 while the remainder is drawn off through valve 75.

A third alternative operation involves supplying both the raw oil and the reflux condensate to mixing tank 36 and there adding finely divided catalyst. This mixture is then supplied to tower 1 through lines 44, 46, 67, 63, heater 64 and lines 65, 57 and either of branch lines 50 or 58, depending on the temperature attained in heater 64.

Another alternative method of operation which is particularly useful in the treatment of raw stocks containing sulphur compounds and similar materials which tend to poison the catalyst involves supplying the raw oil at 66 and forcing it into the lower end of the tower 1 through line 63, heater 64 and lines 65 and 59. In this method of operation reflux condensate from tower 8 is drawn off through lines 38 and 39 to mixing tank 36 and thereafter returned, together with the catalyst supplied at this point, through lines 44, 46, 47, 48, 49 and 50. In this method of operation the raw oil, containing the catalyst poisoning constituents, enters the cracking zone at a point remote from the point of introduction of fresh catalyst and adjacent the point from which residual oil and spent catalyst are withdrawn. In this form of operation the portion of the residual oil from which spent catalyst has been separated in 70 is advantageously recirculated via lines 72, 73, 62, 57 and 58 as previously described. When this form of operation is carried out in an apparatus wherein tower 1 is provided with bubble trays rather than with some other form of baffling means, the raw stock may advantageously enter tower 1 just above the lower bubble tray, branch line 59 being arranged at a level appropriate for this purpose.

In each of these methods of operations gas supplied by compressor 9 enters the lower end of tower 1 through line 13. When the introduction of gas in this manner is first initiated a temporary reduction in the proportion of spent catalyst is noted in the residual oil drawn off through line 68 due to the tendency of the gas to retard the downward passage of the catalyst. This reduction may continue until the proportion of dispersed catalyst in the body of oil in the cracking tower 1 has been increased to as high as 30–50% or even higher. These high ratios of dispersed catalyst to oil may be maintained in cracking tower 1 by regulating the rate at which residual oil is withdrawn therefrom and the rate at which gas is supplied thereto even when the proportion of catalyst in the oil-catalyst mixture supplied to the cracking tower is as low as 1%.

The following examples will serve to illustrate the effect of varying the temperatures and pressures in embodiments of the process of my invention using a specific charging oil and a specific catalyst. In the following operations a Pennsylvania gas oil having a gravity of 35° API was used as the charging oil and a synthetic powdered catalyst containing 80% silica and 20% alumina was used as the catalyst. In one operation 2% by weight of catalyst based on the raw oil was admixed with the raw oil and the reflux condensate. This mixture was preheated in heater 64 to a temperature of 750° F. and then supplied to the top of the packed cracking tower 1. This tower was externally heated to maintain a maximum oil temperature in the tower approximating 825° F. Process gas was supplied to the lower end of the tower at a rate regulated to establish and maintain the proportion of dispersed catalyst in the oil within the tower at approximately 8%. The gas and vapor mixture discharged from the cracking tower was regulated to maintain within the tower a pressure of 100 pounds per square inch. The ratio of reflux condensate to raw oil approximated 1 to 1. Residual oil and admixed catalyst were withdrawn from the lower end of the cracking tower and were not recirculated to any part of the system. Operating in this manner the process produced about 28% of gasoline based on the raw oil, the gasoline having an octane number of 64 as determined by the motor method.

In another operation using this same charging oil, same catalyst, and same ratio of catalyst to raw oil, the same procedure was followed except that the external heating of the cracking tower was regulated to maintain therein a maximum temperature of 750° F. while the pressure on this tower was maintained at 10 pounds per square inch. This operation produced a gasoline yield of 22%, the gasoline having an octane number of 76 as determined by the motor method.

In a third operation using this same charging oil, same catalyst, and same ratio of catalyst to raw oil, the same procedure was followed as in the two operations previously described except that the raw oil and recycled reflux condensate were preheated only to a temperature of approximately 720° F. and the external heating of the cracking tower was controlled to maintain a maximum temperature therein of 810° F. while the pressure on the cracking tower was maintained at 25 pounds per square inch. This operation produced a gasoline yield of 32.4% and approximately 370 cubic feet of gas per barrel of gasoline. The gasoline had an octane number of 76 as determined by the motor method.

I claim:

1. In the catalytic cracking of hydrocarbon oils the improvement which comprises heating a substantial liquid body of oil to be cracked at a moderate cracking temperature while in a vertically elongated cracking zone containing superposed baffling means adapted to distribute dispersed upwardly flowing gaseous products and to impede the downward flow of suspended solids, supplying a finely divided argillaceous catalyst dispersed in oil to be cracked to the upper end of said cracking zone, injecting gaseous products into the lower part of said zone, taking off cracked vapors and gases from the upper end of said zone, withdrawing residual oil and admixed spent catalyst from the lower end of said zone, and supplying fresh charging oil to a lower portion of said zone to contact with partially spent catalyst therein.

2. In the catalytic cracking of hydrocarbon oils the improvement which comprises heating a substantial liquid body of oil to be cracked at a moderate cracking temperature while in a vertically elongated cracking zone containing superposed baffling means adapted to distribute dispersed upwardly flowing gaseous products and to impede the downward flow of suspended solids, supplying a finely divided argillaceous catalyst dispersed in oil to be cracked to the upper end of said cracking zone, injecting gaseous products into the lower part of said zone, taking off cracked vapors and gases from the upper end of said zone, withdrawing residual oil and admixed spent catalyst from the lower end of said zone, separating spent catalyst from at least a portion of the residual oil withdrawn from said zone and reintroducing separated residual oil to said zone for further cracking treatment.

3. In the catalytic cracking of hydrocarbon oils the improvement which comprises heating a substantial liquid body of oil to be cracked at a moderate cracking temperature while in a vertically elongated cracking zone containing superposed baffling means adapted to distribute dispersed upwardly flowing gaseous products and to impede the downward flow of suspended solids, supplying a finely divided argillaceous catalyst dispersed in oil to be cracked to the upper end of said cracking zone, injecting gaseous products into the lower part of said zone, taking off cracked vapors and gases from the upper end of said zone, withdrawing residual oil and admixed spent catalyst from the lower end of said zone, controlling the rate at which gaseous products are supplied to the lower portion of said zone relative to the rates at which oil to be cracked and admixed catalyst are supplied to the upper part of said zone to maintain a high ratio of dispersed catalyst to oil within said zone, and supplying fresh charging oil to a lower portion of said zone to contact with partially spent catalyst therein.

4. In the catalytic cracking of hydrocarbon oils the improvement which comprises heating a substantial liquid body of oil to be cracked at a moderate cracking temperature while in a vertically elongated cracking zone containing superposed baffling means adapted to distribute dispersed upwardly flowing gaseous products and to impede the downward flow of suspended solids, supplying a finely divided argillaceous catalyst dispersed in oil to be cracked to the upper end of said cracking zone, injecting gaseous products into the lower part of said zone, taking off cracked vapors and gases from the upper end of said zone, withdrawing residual oil and admixed spent catalyst from the lower end of said zone, controlling the rate at which gaseous products are supplied to the lower portion of said zone relative to the rates at which oil to be cracked and admixed catalyst are supplied to the upper part of said zone to maintain a high ratio of dispersed catalyst to oil within said zone, separating spent catalyst from at least a portion of the residual oil withdrawn from said zone and reintroducing separated residual oil to said zone for further cracking treatment.

JOHN W. TETER.

REFERENCES CITED

The following references are of record in the file of this patent:

UNITED STATES PATENTS

| Number | Name | Date |
| --- | --- | --- |
| 1,634,666 | Herthel et al. | July 5, 1927 |
| 1,714,091 | Herthel et al. | May 21, 1929 |
| 1,814,042 | Jenkins | July 14, 1931 |
| 1,856,640 | Isom | May 3, 1932 |
| 2,088,214 | Pfirrmann | July 27, 1937 |
| 2,167,211 | Jenkins | July 25, 1939 |
| 1,373,653 | Danckwardt | Apr. 5, 1921 |
| 1,960,672 | Grimm et al. | May 29, 1934 |
| 1,971,190 | Lelgemann | Aug. 21, 1934 |
| 2,231,424 | Huppke | Feb. 11, 1941 |
| 2,249,924 | Wilson | July 22, 1941 |

FOREIGN PATENTS

| Number | Country | Date |
| --- | --- | --- |
| 718,956 | France | Nov. 13, 1931 |